(12) United States Patent
Kamen et al.

(10) Patent No.: US 6,229,541 B1
(45) Date of Patent: May 8, 2001

(54) USE OF TEMPLATES FOR COST-EFFECTIVE SECURE LINKING OF VIDEO STREAM OBJECTS

(75) Inventors: Yakov Kamen, Cupertino; Leon Shirman, Redwood City, both of CA (US)

(73) Assignee: ISURFTV, Sunnyvale, CA (US)

( * ) Notice: Subject to any disclaimer, the term of this patent is extended or adjusted under 35 U.S.C. 154(b) by 0 days.

(21) Appl. No.: 09/417,991

(22) Filed: Oct. 13, 1999

Related U.S. Application Data

(63) Continuation-in-part of application No. 09/389,916, filed on Sep. 3, 1999, which is a continuation-in-part of application No. 09/390,047, filed on Sep. 3, 1999, which is a continuation-in-part of application No. 09/390,044, filed on Sep. 3, 1999.

(51) Int. Cl.$^7$ ........................................................ G06F 3/14
(52) U.S. Cl. ........................ 345/357; 345/356; 345/328; 345/348; 345/339; 707/512; 707/513; 707/515; 707/501
(58) Field of Search ..................... 345/357, 356, 345/328; 707/512, 501, 515, 513

(56) References Cited

U.S. PATENT DOCUMENTS

| | | | |
|---|---|---|---|
| 5,339,392 | * 8/1994 | Risberg et al. | 345/333 |
| 5,627,915 | * 5/1997 | Rosser et al. | 382/219 |
| 5,675,752 | * 10/1997 | Scott et al. | 345/333 |
| 5,721,851 | * 2/1998 | Cline et al. | 345/349 |
| 5,931,908 | 8/1999 | Gerba et al. | 709/219 |
| 6,006,241 | * 12/1999 | Purnaveja et al. | 707/512 |
| 6,028,600 | * 2/2000 | Rosin et al. | 345/327 |
| 6,032,156 | * 2/2000 | Marcus | 707/104 |

* cited by examiner

Primary Examiner—Raymond J. Bayerl
Assistant Examiner—Thomas T. Nguyen

(57) ABSTRACT

A video system comprises a screen. Interactive linking is provided based on a representative set of region-based templates. Each template can be associated with said screen. The template comprises a set of active areas (usually non-intersecting), that can be actuated by moving a cursor to those areas, to thereby invoke a process or link. The link can be to a web page or other information source. In addition to template usage for surfing of active screen areas, templates can be used for secure link (process) activation. Each region can be considered as a symbol ("letter") in the password. By using mouse or similar device user can click ("type") a sequence of symbols to follow an existing password.

61 Claims, 2 Drawing Sheets

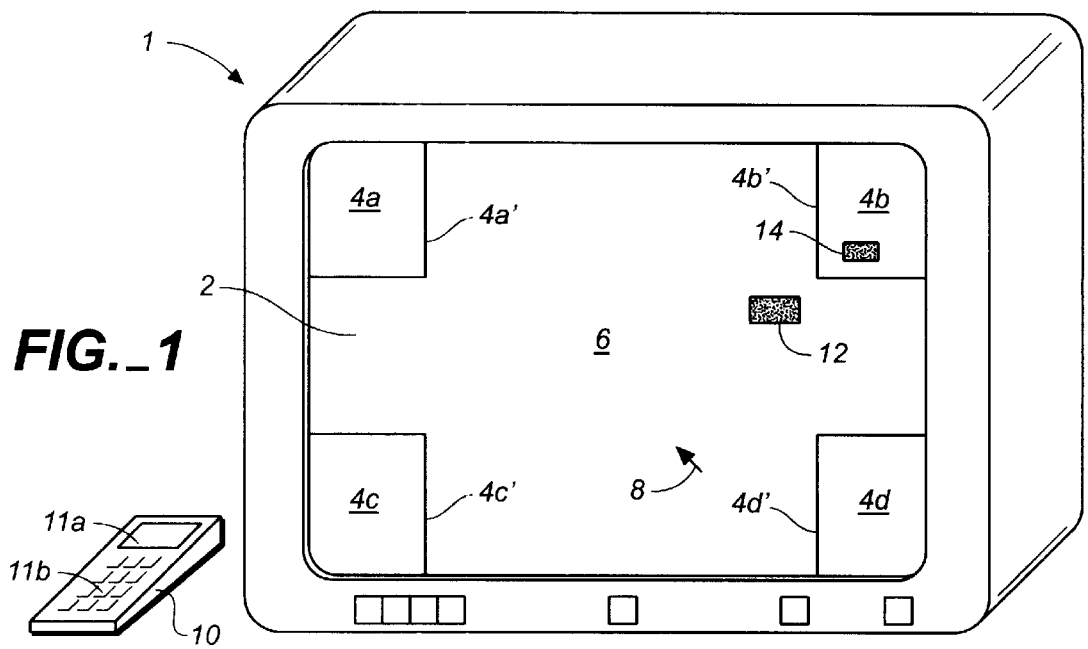
FIG._1
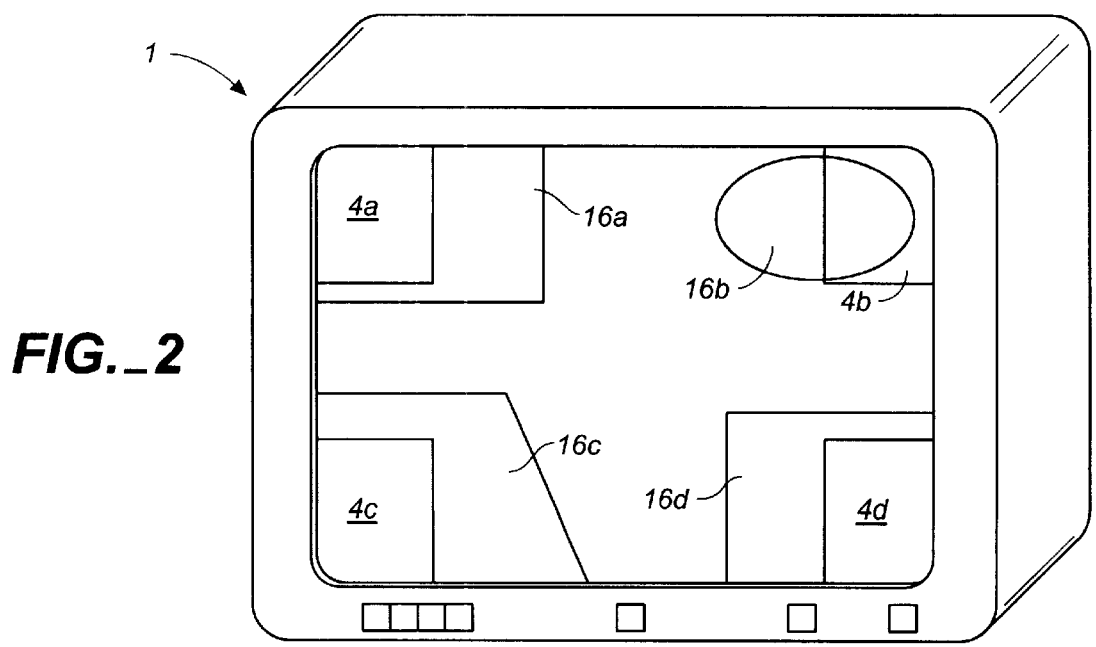
FIG._2

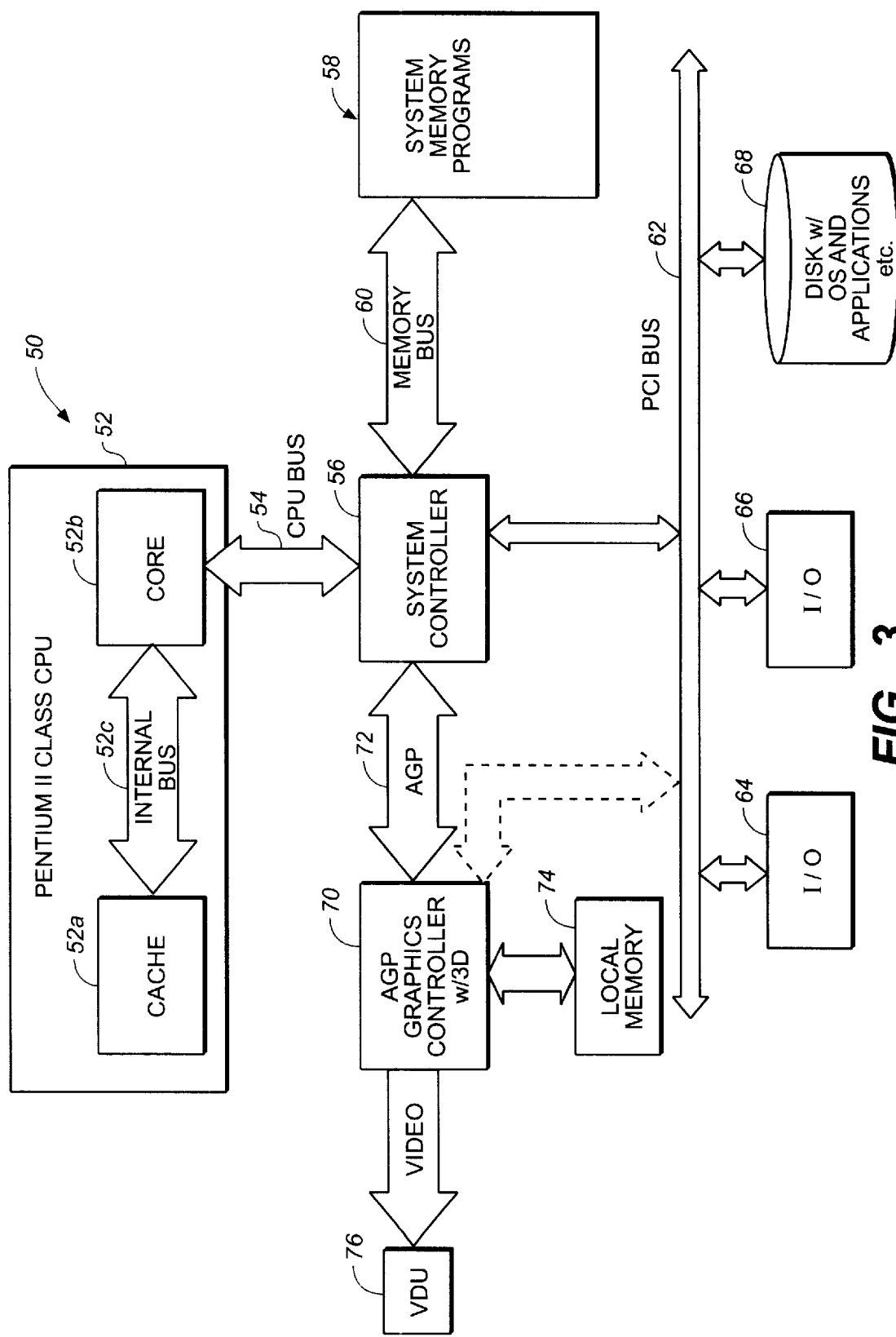
FIG._3

USE OF TEMPLATES FOR COST-EFFECTIVE SECURE LINKING OF VIDEO STREAM OBJECTS

This patent is a continuation in part of U.S. patent applications 09/389,916, 09/390,047 and 09/390,044, each filed Sep. 3, 1999, each of which is incorporated herein by reference.

BACKGROUND OF THE INVENTION

It is known in the art to annotate or "mark" objects in a video stream with an interactive link. For example, suppose one was watching a video program of an automobile race, and there were several racing cars shown driving around a track. Also suppose that these cars were marked with interactive links. This means that one can position a cursor over the image of one of the cars and click on the image (or alternatively, click on special icons associated with the car). This causes the system controlling the video screen to take a predetermined action (e.g. execute a software program, or initiate some other event such as a telephone call) or display information that is linked to that image. This link can be in the form of a pop-up window for note annotation. (A pop-up window for note annotation is a small window that appears on the screen so that a user can write a small note. It is like an electronic "post-it" note.) Alternatively, the link can be in the form of a URL. If the link is invoked, the system will display a web page depicting information concerning the car or driver that has been clicked on. For example, the system can display details concerning the driver. As mentioned above, by clicking on the icon or image, one could also initiate an action, e.g. a telephone call to a merchandise company to buy a memorabilia product related to what has been clicked on.

During annotation, an area or region within the video frames surrounding the image of an object of interest (in the above-mentioned example, the racing car) is established as an "active area." If one moves the cursor into the active area and clicks, one will initiate an action or invoke the link corresponding to the object within that active area. Typically, an object associated with the active area moves about the video screen during a video clip. For example, a video clip of an automobile race shows a group of cars moving about a racetrack, and these cars typically move about a television screen during the clip as the race proceeds. In such a video clip, a car might move from the right side of the video screen to the left side of the video screen. Thus, the active area must also move across the television screen to keep up with the object of interest. The above-incorporated patent applications pertain to methods for annotating video clips, i.e. defining the active area for each object of interest, and for each frame, in the video clip. These methods permit annotation with a reduced amount of human involvement in the process. It would, however, be desirable to further simplify the process of defining active areas in a video clip.

SUMMARY

A method in accordance with the invention comprises the step of providing a template or a set of templates to be associated with a video screen. The template defines a set of active regions of the video screen. The active regions typically do not overlap one another. Each active region corresponds to a process or link that can be invoked. In one embodiment, the link is to an internet web page. When that link is invoked, the contents of the web page are displayed on the screen.

In another embodiment, the link is to a source of information other than an internet web page. For example, the link can cause a video system to display information from a memory to be displayed on the screen. The memory can either be local or non-local.

In yet another embodiment, invoking the link causes a software routine or application program to be executed.

Alternatively, invoking the link initiates an event, e.g. a telephone call.

In one embodiment, the active areas of the template are visible to the user. For example, the active areas of the template can be a particular color, or bear a particular icon, or can be shaded. Thus, the user knows the location of the active areas, and can move a cursor to the active areas to invoke links associated therewith. In another embodiment, the active areas are not visible. However, when the cursor is moved to the active areas, the appearance of the cursor changes, so the user knows that the cursor is positioned over an active area. In yet another embodiment, the active areas are not visible, and the cursor does not change appearance when positioned over the active areas.

The video screen can display any type of video information, e.g. a still image, a video image, a web page, a Windows-type desk top output, or other computer output. For example, a user can watch a television program on the video screen and manipulate a cursor to invoke the links associated with the template. Alternatively, the user can read a web page on the video screen and can manipulate a cursor to invoke the links associated with the template.

One advantage of this invention is that the use a set of templates is a simple way of providing robust dynamic linking. A person using the template does not have to chase a small moving object on a screen with a cursor in order to invoke a link.

A set of templates in accordance with one embodiment of the invention allows a content provider to choose the most appropriate template without complicated content-oriented linking (i.e. without the complication of having the active areas move in sync with associated objects on the video screen). In some cases this solution can be preferable to fixed static icon (one fixed template) solutions and completely dynamic (moving active area) solutions.

In accordance with another aspect of the invention, templates can be used for secure communication of data associated with a video stream. For example, in one embodiment, each active area of a template can be considered as a symbol (or letter) that is part of an arbitrary complicated password, which allows a user to be re-directed to selected internet pages, to call a secret telephone number or start a special application.

These and other aspects of the invention are described in greater detail below.

BRIEF DESCRIPTION OF THE DRAWINGS

FIG. 1 illustrates a video screen including an overlay template comprising a set of active areas.

FIG. 2 illustrates a second template overlaying a first template on a video screen.

FIG. 3 is a block diagram illustrating a video system in accordance with the invention.

DETAILED DESCRIPTION

Referring to FIG. 1, video system 1 comprises a substantially rectangular video screen 2 having active regions 4a to 4d and a region 6. Regions 4a to 4d correspond to a "template." Video screen 2 can display any type of visual information. For example, in one embodiment, screen 2 displays a still image, e.g. a picture. In another embodiment, screen 2 displays a movie or television program. In another embodiment, screen 2 displays a web page. In yet another embodiment, screen 2 displays a computer output, e.g. an image of a Windows-type desk top. Screen 2 can be a CRT screen, an LCD screen, a video projection screen, or other type of screen capable of displaying a visual image. The image displayed on screen 2 can originate from a conventional television receiver that receives radio waves or a receiver that receives signals from a cable or optical fiber. Alternatively, the image on screen 2 can originate from the internet, from a personal computer, a VCR, or other source of visual information, either in digital or analog form.

In a first embodiment, regions 4a to 4d are not visually distinguishable from the remainder of screen 2. In other words, if screen 2 is displaying a television program, one cannot tell, merely by looking at screen 2, where regions 4a to 4d are located.

Also shown on screen 2 is a cursor 8. Cursor 8 can be any shape, or have any appearance. A user manipulates cursor 8 with a control device, e.g. a remote controller 10 comprising a joystick, trackball, mouse, touch pad (e.g. touch pad 11a) or appropriate control buttons 11b. If a user moves cursor 8 to region 4a, a link is invoked corresponding to region 4a. If the user moves cursor 8 to region 4b, a link is invoked corresponding to region 4b, and so forth. In one embodiment, the link is to a web page. Moving the cursor to region 4a invokes the link, and information corresponding to the web page is displayed on screen 2. (In an alternative embodiment, one must move cursor 8 to region 4a and click on region 4a to invoke the link, rather than merely moving cursor 8 to region 4a.)

In another embodiment, the link is to a data source other than a web page. This data source could be another source of visual information, e.g. another movie or television program. Alternatively, the link could execute application software. Alternatively, the link could result in the display of data from a local data source, e.g. a disk drive, or a non-local data source. In one embodiment, the link is to a pop-up window for note annotation.

As mentioned above, in a first embodiment, regions 4a to 4d are not visible per se. In a second embodiment, when cursor 8 is moved to one of regions 4a to 4d, cursor 8 changes appearance (e.g. cursor 8 changes shape, color, light intensity, or otherwise manifests a changed appearance). Thus, a user can determine whether cursor 8 is located in an active region by observing the appearance of cursor 8.

In a second embodiment, regions 4a to 4d can be detected visually. For example, regions 4a to 4b can be shaded differently from other portion 6 of screen 2. Thus, a user can still use the entire video screen to watch a video image, but the user will know where the active regions are located. In lieu of shading the active regions differently, a set of lines such as lines 4a' to 4d' are visible so that a user can see where the active regions are located.

In a third embodiment, an image is displayed in region 6 of screen 2, but that image is not displayed in active regions 4a to 4d. Thus, regions 4a to 4d can be used to display something other than that image, e.g. other visual information such as icons, alphanumeric information, thumbnail still or video images, and so forth. The images displayed in regions 4a to 4d can come from any appropriate source, e.g. a cable or optical fiber, a conventional television receiver, a computer memory (either local or remote), a VCR or other source of visional information.

In this embodiment, regions 4a to 4d can be thought of as containing images interposed over and eclipsing the main image on screen 2. In one embodiment, the images in regions 4a to 4d can be generated using a 3D graphics chip within the video display system. Circuitry for providing the images in regions 4a to 4d can be as described in U.S. patent application Ser. No. 09/344,442, filed Jun. 25, 1999. (The '442 application discloses means for binding 2D images to a planar surface using a 3D graphics pipeline. The '442 application is incorporated herein by reference.)

In a version of the third embodiment, one can adjust the images in regions 4a to 4d from being completely opaque to completely transparent, or somewhere in between. In other words, when the images in regions 4a to 4d are completely opaque, any underlying image is completely eclipsed. By rendering regions 4a to 4d more transparent, one can perceive a "ghost image" of the information displayed in regions 4a to 4d along with the underlying image. By rendering regions 4a to 4d completely transparent, one simply sees the underlying image in regions 4a to 4d of screen 2.

In a fourth embodiment, regions 4a to 4d display images that periodically change. For example, for thirty seconds, a first thumbnail still or video image appears in region 4a, and thereafter, a second image appears in region 4a. After another thirty seconds elapses, a third image appears in region 4a. The link associated with region 4a can change at the same time the image changes. Alternatively, in other embodiments, the link remains unchanged. In one embodiment, invoking the link associated with region 4a alters the image shown in regions 4b to 4d. In another embodiment, invoking the link associated with one region does not affect the images shown in the other active regions.

In a fifth embodiment, the size and/or appearance of regions 4a to 4d can be changed, e.g. by actuating appropriate buttons on controller 10. Thus, regions 4a to 4d can be made smaller or larger.

In one embodiment, the links associated with regions 4a to 4d are related to the content displayed in region 6. (In this embodiment, the template comprising regions 4a to 4d is typically provided by the content provider of the image shown in region 6.) For example, if region 6 displays a sporting event, regions 4a to 4d might correspond to links for displaying information about that or related sporting events. Thus, if the sporting event is a baseball game, regions 4a to 4d might correspond to links concerning statistics pertaining to the teams or players. In addition, the images depicted in regiosn 4a to 4d are related to the content displayed in region 6. However, in another embodiment, the images shown at regions 4a to 4d are unrelated to the content displayed in region 6.

As mentioned above, regions 4a to 4d form a template. Suppose the image on screen 2 is annotated with links corresponding to active regions 12 and 14. Region 12 is located within region 6 and outside regions 4a to 4d, and is activated e.g. by using cursor 8 to click on active region 12. Thus, a user can invoke the link associated with region 12 by using cursor 8 to click on region 12, even though the template is active. However, region 14 is located within region 4c. The template covers active area 14, and the link associated with area 14 cannot be invoked unless one removes the template (e.g. in a manner discussed below). Thus, if one moves cursor 8 to area 14 in an effort to invoke the link associated with area 14, one will only succeed in invoking the link associated with region 4c.

As mentioned above, in one embodiment, the image on screen 2 is a video image. This image can be annotated with links in the manner described in the above-incorporated patent applications. In other words, portions of a video image are associated with interactive links. By placing the template over the video image, any links underneath regions 4a to 4d are effectively masked.

In another embodiment, the image on screen 2 is a web page. Web pages typically include active areas for invoking links to other web pages. If screen 2 displays a web page, those links appearing within region 6 can be accessed by a user, and invoked in the normal manner. However, those links within regions 4a to 4d are effectively masked, and cannot be invoked by a user unless the template is removed.

The template itself is typically stored in a memory device associated with the video system of which screen 2 is part. This memory device can be a semiconductor memory such as a RAM, a ROM, an EPROM, a disk drive, tape drive, or other memory device. This memory stores the location of the active regions 4a to 4d, and the links (e.g. URLs) with which regions 4a to 4d are associated. In one embodiment, the template (e.g. the links associated with active regions 4a to 4d) is determined by the user. In other words, a person viewing screen 2 can determine the links that are associated with regions 4a to 4d, e.g. by inputting appropriate link address information into a memory, e.g. with an alphanumeric keypad coupled to video system 1. (The keypad can be part of controller 10 or some other structure coupled to system 1.) The user can activate or deactivate the template.

In another embodiment, the template can originate from the same source as the video information displayed on screen 2. For example, if the program displayed on screen 2 originates from a cable TV source, the links associated with active regions 4a to 4d also originate from that source. (Optionally, the locations of active regions 4a to 4d within screen 2 can also originate from that source.)

In another embodiment, the links can originate from a source that is different from the origin of the image displayed on screen 2. For example, the image on screen 2 can be a conventional television program received from a radio antenna, whereas the links can be obtained via the internet. Optionally, the location of regions 4a to 4d can also be received from the internet.

In one embodiment, a user can activate or deactivate the template, e.g. by pressing an appropriate control button on remote control device 10. If deactivated, regions 4a to 4d no longer serve as active regions, and any active regions previously masked by regions 4a to 4d become unmasked. Thus, active region 14, previously masked by region 4b, can then be clicked on, and the link associated with active region 14 can be invoked. When deactivated, any visual indication of the location of regions 4a to 4d is removed. Thus, if regions 4a to 4d previously had a different appearance, when the template is deactivated, regions 4a to 4d of screen 2 no longer have a different appearance. If, prior to deactivation, cursor 8 had a different appearance when positioned in regions 4a to 4d, when deactivated, cursor 8 no longer takes on a different appearance when positioned in regions 4a to 4d. Regions 4a to 4d are typically activated or deactivated together as a group, e.g. by actuating the above-mentioned control buttons. In another embodiment, regions 4a to 4d can be individually activated or deactivated.

A user can also reactivate the template, e.g. by actuating an appropriate control button on remote control device 10. Alternatively, a user can activate a different template, e.g. by actuating an appropriate control button on remote control device 10. This different template can have active regions having shapes and locations that are different from regions 4a to 4d. Also, the links associated with this different template can be to data sources other than the links associated with regions 4a to 4d.

A user can also place one template over one or more other templates. For example, referring to FIG. 2, by actuating an appropriate button on controller 10, a user can activate a template having regions 16a to 16d. As can be seen, region 16a entirely covers and masks region 4a. Region 16b is elliptical, and only masks a portion of region 4b. Thus, portions of region 4b are still accessible. Region 16c is trapezoidal, but still covers and masks all of region 4c. A user can deactivate the template corresponding to regions 16a to 16d if so desired by actuating an appropriate button on controller 10.

In one embodiment, the various templates can be activated, deactivated, and placed over one another by an external source, e.g. the source providing the image in region 6 of screen 2. As indicated above, this image can come from any of a number of places, e.g. a video broadcast using radio waves, optical cable or electrical cable. This image can originate from other sources as well, e.g. the internet. Thus, the provider of this image can determine which templates should be associated with the image at any given time.

In one embodiment, a template can be activated for only a predetermined time and then deactivated. Thus, if the image is a quiz show, the active regions can correspond to the answers to a question being asked on the quiz show. The active template might remain active for only so long as the question was pending.

In one embodiment, each region 4a to 4d represents an independent link. In another embodiment, one can actuate regions 4a to 4d in different orders to obtain different results. For example, if one clicked on regions 4a, 4b, 4a, 4d, that might constitute a "code" for causing a certain event to occur, or for invoking a certain link. Alternatively, if one clicked on a different sequence of regions, that might cause a different event to occur, or invoke a different link. Templates could be added or removed, depending upon this order. Alternatively, templates could be locked in place or locked out, depending upon this order. (This capability of requiring active areas 4a to 4d to be actuated in a certain order could be used for security purposes, e.g. for permitting or forbidding a user to access certain information, video images or web pages. Alternatively, this capability might also be part of a game, e.g. a user would have to figure out certain clues in order to figure out the correct order in which to actuate regions.)

One embodiment of our invention can be practiced using a PC having the following:
1. A CPU such as a Celeron or Pentium, e.g. as manufactured by Intel, or a K6/K7 processor, e.g. as manufactured by Advanced Micro Devices.
2. 24 MB of memory or greater.
3. The operating system can be Windows 95, Windows 98, WinCE, Win2000, or any other operating system that supports Direct X, Direct 3D and/or Direct Draw.

These packages can be used to apply images to regions 4a to 4d. The Windows operating system includes a standardized platform called Direct X for Windows.

FIG. 3 is a block diagram of a computer system 50 for performing a method in accordance with our invention. Referring to FIG. 3, system 50 comprises a CPU 52, e.g. a Pentium II class CPU, comprising a cache memory 52a, a core 52*b* and an internal bus 52*c* for facilitating communication between core 52*b* and cache 52*a*. Core 52*b* communicates via a CPU bus 54 to a system controller 56. System controller 56 communicates with the system memory 58 via a memory bus 60. System memory 58 includes system memory.

Also included in system 50 is a PCI bus 62 for facilitating communication between system controller 56 and I/O devices 64, 66 and disk drive 68. I/O device 64 can be any type of I/O device, e.g. a modem or telephone for communicating with a telephone line. In one embodiment, I/O device 66 is a video capture card with a driver. The video capture card can be coupled to receive a video program from an antenna, a cable or optical fiber, a VCR, a video disk, or other video signal source. Data from the video capture card is either loaded by DMA (direct memory access) or CPU 52 into a frame buffer, typically within main memory 58. However, the frame buffer may be in other memories within system 50.

Graphics controller 70 uses its own local memory 74 to generate and store pixel arrays to be displayed on a video display unit 76.

It is emphasized that system 50 is only one example of a system that performs a method in accordance with our invention. Other hardware can be used as well.

Stored within a memory within video display system 1 are the locations on screen 2 of regions 4*a* to 4*d*. CPU 52 (or other logic hardware within system 1) determines whether cursor 8 has been moved to one of regions 4*a* to 4*d*, i.e. by comparing the position of cursor 8 to the values stored in memory corresponding to the location of regions 4. (This memory can be memory 58 or another memory within the system.)

As mentioned above, the image displayed on screen 2 can be annotated with active areas. The locations of these active areas (and the links associated with the active areas) are also stored in the above-mentioned memory (e.g. memory 58). Microprocessor 52 (or the above-mentioned other hardware) also compares the position of cursor 8 with the locations of these other active areas. However, microprocessor 52 (or the other hardware within the system) also ascertains whether these other active areas are masked by the template (e.g. regions 4*a* to 4*d*). If the cursor is moved over an active area which is masked by region 4*a*, for example, microprocessor 52 ascertains that the link associated with region 4*a* is to be invoked.

Memory 58 can store numerous templates, each of which can be activated or deactivated, e.g. by controller 10. These templates can also be placed over one another.

While the invention has been described with respect to specific embodiments, those skilled in the art will appreciate that changes can be made in form and detail without departing from the spirit and scope of the invention. For example, any type of display screen can be used in conjunction with the invention. For example, projection video display screens, LCDs, CRTs or other types of display devices can be used. Similarly, although the drawings display a screen depicting four active regions, different numbers of active regions can be used.

Although the template of FIG. 1 permits active areas within region 6 to be activated, in other embodiments, only the active areas of the active template itself can be activated.

As mentioned above, in one embodiment video system 1 displays various images in regions 4*a* to 4*d*. In one embodiment, these images can be applied to regions 4*a* to 4*d* using a method discussed in U.S. patent application Ser. No. 09/344,442. Accordingly, all such changes come within the invention.

We claim:

1. A video system comprising:
   a screen for displaying visual information; and
   said video system containing a plurality of templates, each template comprising a non-overlapping set of active regions of the screen, whereby said templates are substantially transparent outside of said active regions, and whereby when said templates are not activated, said visual information can be seen by a viewer, and when one of said templates is activated, said visual information can still be seen by said viewer.

2. Video system of claim 1 wherein said active regions invoke links to a data source.

3. Video system of claim 1 wherein said active regions initiate application software.

4. Video system of claim 1 wherein said screen displays a cursor, said system further comprising a control device for manipulating the position of the cursor to thereby select one of the active regions.

5. System of claim 1 wherein activation of one of said templates does not substantially modify the image appearing on those portions of said screen outside of said non-overlapping set of active regions of the screen.

6. System of claim 1 wherein said video system contains a plurality of templates, said system comprising memory locations for storing the locations of the active regions of said templates and memory locations for storing links associated with said active regions.

7. System of claim 1 wherein said active regions depict icons, alphanumeric information, thumbnail still images or video images.

8. System of claim 1 wherein when one of said templates is activated, said active regions are invisible.

9. A video system comprising:
   a screen for displaying visual information; and
   a memory for storing information corresponding to a plurality of templates, said templates establishing a set of regions on the screen as active regions, whereby said templates are substantially transparent outside of said active regions, and whereby activating one of said templates does not substantially prevent a viewer from viewing the visual information that was on said screen prior to activating said one of said templates.

10. System of claim 9 wherein said active regions are used for invoking links.

11. System of claim 9 wherein said video system displays a first image, said first image being annotated such that a set of active areas are associated with said first image, and wherein when templates is activated, the active areas associated with said first image located at said set of regions are masked.

12. System of claim 11 wherein said first image is a video image.

13. System of claim 11 wherein said first image is a web page and said active areas associated with said first image comprise hyperlinks.

14. System of claim 11 wherein said first image is a still image.

15. System of claim 11 further comprising a memory for storing a second template, wherein said first template can be replaced with said second template.

16. System of claim 15 wherein said second template replaces said first template for a predetermined amount of time, and wherein at the conclusion of said predetermined amount of time, said second template is deactivated and replaced with said first template.

17. System of claim 15 wherein when said second template is activated, any active regions underneath the active regions of said second template are masked, but there are active regions that are not underneath the active regions of said second template, are not masked, and remain active.

18. System of claim 17 wherein said second template can be placed over said first template, whereby portions of the active areas of said first template underlying the active areas of said second template are masked, but there are portions of the active areas of said first template that are not underlying the active areas of said second template, are not masked, and remain active.

19. System of claim 11 further comprising a control device for selectively making the active regions of the first template visible or invisible, but wherein said active regions remain active when they are invisible.

20. System of claim 9 wherein said video system displays a first image, said first image being annotated such that a set of active areas are associated with said first image, and wherein when templates is activated, active areas associated with said first image are all masked.

21. System of claim 9 wherein at least a first one of said templates comprises a security feature for denying or permitting access to additional information, wherein said access is obtained by clicking on a predetermined sequence of the active regions of the first one of said templates.

22. System of claim 21 wherein said additional information comprises a web page.

23. System of claim 21 wherein said additional information is a video program.

24. System of claim 9 wherein said templates and visual information are provided by the same source.

25. System of claim 24 wherein said visual information is video information.

26. System of claim 25 wherein the templates and video information are provided by an antenna, a memory device, an optical fiber, a cable TV source or the internet.

27. System of claim 9 wherein activation of one of said templates does not substantially modify the image appearing on those portions of the screen outside said active regions.

28. System of claim 27 wherein said active regions are depict icons, alphanumeric information, thumbnail still images or video images.

29. Method comprising:
    displaying a first image on a display device, said display device being part of a display system; and
    activating a first template selected from a plurality of templates over said first image, said first template comprising a set of active areas associated with links, said first template being substantially transparent outside of said active areas, and whereby said links can be activated by selecting one of said active areas, and wherein said first image is visible both before and after said activating of said first template.

30. Method of claim 29 further comprising the act of invoking one of said links, said act of invoking comprising moving a cursor to one of said active areas associated with said link.

31. Method of claim 29 wherein said first image corresponds to a web page comprising hyperlinks, wherein when said first template is established over said first image, at least some of said hyperlinks are underneath and masked by the active areas of said first template.

32. Method of claim 29 wherein said image is a video image annotated with active regions, and wherein when said first template is established over said first image, at least some of said active regions are underneath and masked by the active areas of said first template.

33. Method of claim 29 further comprising activating a second template over said first template, the active regions of said second template extending over at least some of the active regions of the first template, whereby the portions of the active regions of the first template that are covered by said second template are rendered inactive.

34. Method of claim 29 further comprising entering data into the system, said data being entered by selecting the different active regions of said first template.

35. Method of claim 29 further comprising entering a security password into the system, said password being entered by selecting different active regions of said first template.

36. Method of claim 29 wherein said first template and said image are provided by the same content provider.

37. Method of claim 36 wherein said first template and said image are provided from a single signal source.

38. Method of claim 29 wherein activation of said first template does not substantially modify the image appearing on those portions of the display device outside said active areas.

39. System of claim 38 wherein said active areas depict icons, alphanumeric information, thumbnail still images or video images.

40. Method of claim 29 wherein when said first template is activated, said active areas are invisible.

41. A method comprising the steps of providing a visual image and template information corresponding to a plurality of templates to a display system, said template information comprising the location of active areas to be established on a display screen and bits to be associated with said active areas, said templates being substantially transparent outside of said active areas, whereby said templates can be made active or inactive without preventing access to said visual information.

42. Method of claim 41 wherein said visual information is video information.

43. Method of claim 41 wherein said providing of said visual image and said template information comprises broadcasting said visual image and said template information to a plurality of display systems.

44. Method of claim 41 further comprising providing a plurality of templates to said display system.

45. Method of claim 41 wherein said visual image and said template information are provided from a memory device.

46. Method of claim 45 wherein said memory device comprises an optical disk, a magneto-optic disk, a magnetic disk or magnetic tape.

47. Method of claim 41 wherein at least one of said links is a link to a web page.

48. Method of claim 41 wherein at least one of said links is a link to a memory location.

49. Method of claim 41 wherein said display system is coupled to a telephone line and at least one of said links causes said display system to initiate a telephone call.

50. A video system comprising:
    a screen for displaying visual information; and
    said video system containing a plurality of templates, each template comprising a non-overlapping set of active regions on the screen, activation of one of said templates affecting substantially only said non-overlapping set of active regions of said screen, and wherein said templates are substantially transparent outside of said active regions.

51. System of claim 40 wherein when one of said templates is active, said active regions are not visible to the user.

52. System of claim 50 wherein when one of said templates is active, said active regions are visible to the user.

53. A video system comprising:

a screen for displaying visual information; and a memory for storing information corresponding to a plurality of templates, said templates establishing a set of regions on the surface of said screen as active regions, whereby a template within said plurality, when activated, substantially affects only said set of active regions of said screen, wherein said templates are substantially transparent outside of said active regions.

54. System of claim 53 wherein when one of said templates is active, said active regions are not visible to the user.

55. System of claim 53 wherein when one of said templates is active, said active regions are visible to the user.

56. Method comprising:

displaying a first image on a display device, said display device being part of a display system; and activating a first template over said first image, said first template being selected from a plurality of templates, said first template comprising a set of active areas associated with links, said first template affecting substantially only said set of active areas, whereby said links can be activated by selecting one of said active areas, said first template being substantially transparent outside of said active areas.

57. Method of claim 56 wherein when said first template is activated, said activated areas arm not visible.

58. Method of claim 56 wherein when said first template is activated, said active areas are visible.

59. A method comprising the steps of providing a visual image and template information to a display system, said template information corresponding to a plurality of templates, said template information comprising the location of active areas to be established on a display screen and links to be associated with said active areas, whereby said templates affect substantially only said active areas and said templates are substantially transparent outside of said active areas.

60. Method of claim 59 wherein when one of said templates is activated, said active areas are not visible.

61. Method of claim 59 wherein when one of said templates is activated, said active areas are visible.

* * * * *